United States Patent [19]

Reischl et al.

[11] Patent Number: 5,000,853
[45] Date of Patent: Mar. 19, 1991

[54] PROCESS FOR THE IMPROVED SEPARATION OF CLARIFIED LIQUID FROM BIOMASS IN THE BIOLOGICAL TREATMENT OF SEWAGE

[75] Inventors: Artur Reischl, Hoechenschwand; Hanno Henkel, Krefeld; Friedhelm Sahlmen, Moers, all of Fed. Rep. of Germany

[73] Assignee: Bayer Aktiengesellschaft, Fed. Rep. of Germany

[21] Appl. No.: 457,205

[22] Filed: Dec. 26, 1989

Related U.S. Application Data

[63] Continuation-in-part of Ser. No. 376,775, Jul. 7, 1989, abandoned, which is a continuation of Ser. No. 266,190, Nov. 2, 1988, abandoned, which is a continuation of Ser. No. 110,898, Oct. 20, 1987, abandoned, which is a continuation of Ser. No. 886,855, Jul. 18, 1986, abandoned.

[30] Foreign Application Priority Data

Jul. 23, 1985 [DE] Fed. Rep. of Germany ....... 3526183

[51] Int. Cl.$^5$ ................................................ C02F 3/10
[52] U.S. Cl. .................................... 210/616; 210/631; 210/695; 435/173
[58] Field of Search .......................... 210/616-618, 210/626, 631, 695; 435/173, 176, 180

[56] References Cited

U.S. PATENT DOCUMENTS

| | | | |
|---|---|---|---|
| 4,152,210 | 5/1979 | Robinson et al. | 435/173 |
| 4,200,524 | 4/1980 | Levin | 210/616 |
| 4,576,718 | 3/1986 | Reischl et al. | 210/616 |
| 4,735,725 | 4/1988 | Reischl et al. | 210/616 |

OTHER PUBLICATIONS

Lehrund Handbuch der Abwassertechnik, vol. II and Korrespondenz Abwasser, No. 4, 1985.
L. O. Kolarik, Water Research, vol. 17, pp. 141-147, 1984.
C. deLatour and H. K. Holm, Journal of the American Waterworks Assoc., Jun. 1977, pp. 325-327.
R. Yadidia et al., Environmental Science & Technology, vol. II, No. 9, pp. 913-916, 1977.

*Primary Examiner*—Tom Wyse
*Attorney, Agent, or Firm*—Joseph C. Gil

[57] ABSTRACT

The present invention relates to a process for the improved separation of clarified liquids from biomass or rather for the separation of clarified sludges in the (aerobic and/or anaerobic) biological treatment of sewage using magnetically separable materials as carrier masses. The carrier masses are organic materials containing magnetically separable inorganic materials incorporated in abrasion-resistant form. These magnetically separable carriers occupy a suspension volume of from 1 to 85% by volume, based on the clarified liquid.

The carriers contain magnetically separable inorganic materials incorporated as fillers in organic polymeric materials, particularly in cellular polymeric carriers. Other organic or inorganic fillers may also be used in these organic carriers. The magnetically separable materials used are oxides or mixed oxides of heavy metals, preferably iron oxides, such as $Fe_3O_4$ (magnetite) and $\gamma$-$Fe_2O_3$, which are used in average particle sizes of less than 50 $\mu$m, preferably less than 10 $\mu$m and more preferably less than 3 $\mu$m, for example from 0.1 to 1 $\mu$m.

These magnetic carriers provide for magnetic separation of the biomasses containing these magnetic materials in the biological treatment of sewage.

13 Claims, 1 Drawing Sheet

PROCESS FOR THE IMPROVED SEPARATION OF CLARIFIED LIQUID FROM BIOMASS IN THE BIOLOGICAL TREATMENT OF SEWAGE

CROSS REFERENCE TO RELATED APPLICATIONS

This application is a continuation in part of U.S. application Ser. No. 376,775, filed on Jul. 7, 1989, which in turn was a continuation of U.S. application Ser. No. 266,190, filed Nov. 2, 1988, now abandoned, which in turn was a continuation of U.S. application Ser. No. 110,898, filed Oct. 20, 1987, now abandoned, which in turn was a continuation of U.S. application Ser. No. 886,855, filed Jul. 18, 1986, now abandoned.

BACKGROUND OF THE INVENTION

In biological sewage treatment plants, the biological sewage treatment process is carried out aerobically and anaerobically using microorganisms, the organic impurities in the sewage being eliminated. In the metabolic processes which take place, the microorganisms proliferate in large numbers.

In practice, the so-called activated sludge process is predominantly used for the aerobic and/or anaerobic treatment process using the continuous-flow principle. In continuous-flow operation, sewage and activated sludge are fed to the activated-sludge tank where, in the aerobic or anaerobic process, the biochemical processes take place. The oxygen may be supplied in such a way that, at the same time, high turbulence is generated in the activated-sludge tank, ensuring optimal mixing of sewage and activated sludge.

The mixture of sewage and activated sludge flows from the activated-sludge tank into intermediate or final settling tanks in which the activated sludge separates from the purified sewage. To maintain as high a concentration of activated sludge as possible in the activated-sludge tank, most of the activated sludge deposited in the intermediate or final settling tanks is recycled for reuse. Only the surplus activated sludge formed by proliferation of the microorganisms is removed from the system and fed to the clarified sludge disposal stage.

Accordingly, most of the activated sludge is in a state of permanent circulation. However, the separation of sewage and activated sludge in the final settling tanks is difficult because, in many cases, the activated sludge is particularly light and, because of this, only settles very slowly or incompletely. However, a high degree of settling and the almost complete recycling of the activated sludge are essential for ensuring the necessary degree of purification and for remaining within legally stipulated limits.

It is standard practice to base the dimensions of the intermediate and final settling tanks on retention times of from 2 to 4 hours. However, where the tank volume is predetermined by the retention time, it is only possible to achieve a high degree of efficiency when the dimensions of the final settling tanks are also optimally selected for the settling process of the activated sludge.

Determining factors so far as the dimensions are concerned are the length, width or depth, diameter and volume of the final settling tank. The dimensions are characterized by the load per unit area per hour ($m^3$ sewage/$m^2$ surface . h). The load per unit area of the final settling tanks must always be lower than the settling rate of the activated sludge.

However, the limit for the load per unit area of the final settling tanks is ultimately determined by the condition and quantity of the sludge introduced with the sewage.

Settling behavior is characterized by the sludge index (Isv) which indicates how large the volume ($V_s$) of 1 g of sludge dry matter ($TS_R$) is after a settling time of 30 minutes.

$$I_{sv} = \frac{V_s}{TS_R} = \frac{ml}{g}$$

With properly dimensioned tanks, it is generally possible to obtain a good settling effect for a sludge index of <100 ml/g. If, however, the settling process is impeded by high solids loads and, in particular, by the formation of bulking sludge, the activated sludge floats and drifts.

The settling processes are seriously impeded, beginning at a sludge index of >150 ml/g. There are various known causes for this increase, including, for example, the inclusion of materials of light specific gravity (such as fats) in the activated sludge, buoyancy through adhering gas bubbles (particularly in denitrification process) and especially the formation of bulking sludge through filament-like organisms which proliferate in relatively large numbers.

This phenomenon is particularly serious in that it increases the settable materials in the effluent of the treatment plant, which significantly exceed the legally stipulated maximum limit of 0.5 ml/l, and deprives the system of biologically active sludge which seriously reduces the efficiency of treatment.

To improve the settling behavior of activated sludges and to eliminate bulking sludge, the literature (cf.Lehr- und Handbuch der Abwassertechnik, Vol. II, 2nd Edition, and Korrespondenz Abwasser No. 4, 1985) describes such measures as, for example, damaging the filament-like microorganisms by chlorine or hydrogen superoxide, various process modifications, increasing the weight of the activated sludge by preclarified sludge, adding lime and/or iron or aluminium salts. All these measures are attended by the disadvantage that they are only partly successful, are only effective after prolonged treatment times, involve very considerable expense, or give rise to disadvantages in the subsequent disposal of the clarified sludge.

The use of alkaline pretreated magnetite particles for the removal of discoloration and turbidity from river water is described in L. O. Kolarik, Water Research, Vol. 17, pgs. 141-147 (1984). The magnetite is regenerated by acidifying (emission of absorbed particles) and subsequent alkali treatment (magnetite particles become again positively charged and active). Untreated magnetite proved to be practically without effect for the river water treatment.

Similar water purification processes are described by C. deLatour and H. K. Holm in the Journal of American Waterworks Association, June 1977, pgs. 325-327. Other water purification processes with magnetite relate to the removal of algae through absorption with magnetite in the presence of ferric chloride (R. Yadidia et al., Enviromental Science and Technology, Vol. 11, No. 9., pgs. 913-916, 1977).

It has now surprisingly been found that the above disadvantages can be avoided by using magnetically separable materials which, as carrier materials, provide for rapid settling of the activated sludge as a whole. In addition, it is possible by addition of these magnetically separable materials to obtain a distinctly higher concentration of activated sludge and, hence, higher throughputs in the activated sludge tanks and the final settling tanks. By applying magnetic field, excellent separation is obtained. It is also possible to separate off the activated sludge without final settling tanks.

DESCRIPTION OF THE INVENTION

Figure 1:
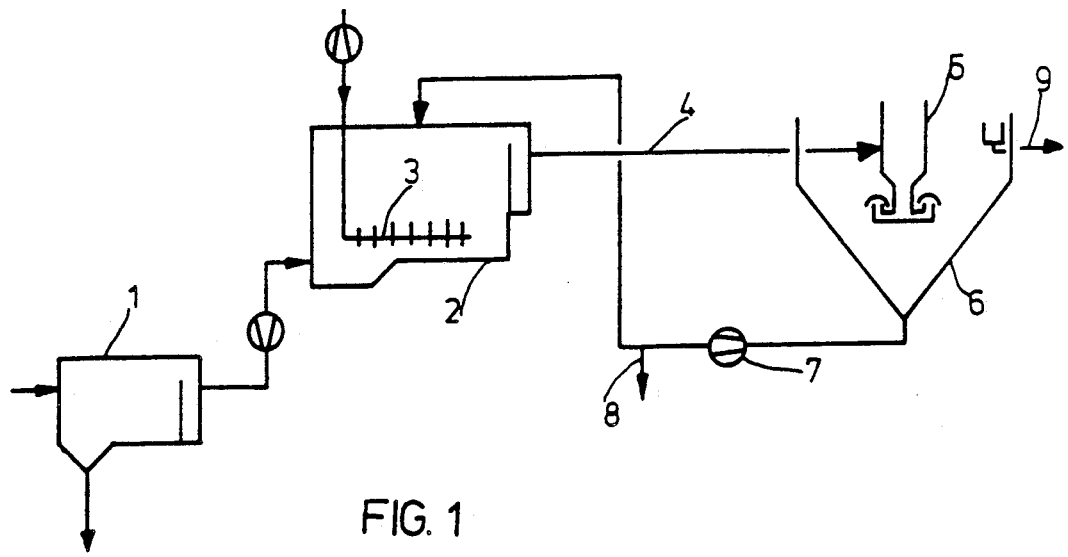
FIG. 1 represents a schematic of a biological treatment.

The present invention relates to a process for the improved separation of clarified liquid from biomass in the biological treatment (aerobic and/or anaerobic, including nitrifying or denitrifying) of sewage, comprising (a) combining the biomasses in the clarified liquid with organic polymer carriers containing magnetically separable inorganic materials, the carriers containing from 1 to 99% by weight, based on the dry weight of the carrier, of said inorganic materials, said carriers occupying a suspension volume of from 1 to 85% by volume, based on the clarified liquid: and (b) separating said biomasses which contain the organic polymeric carriers from said clarified liquid by application of a magnetic field.

Another preferred embodiment is characterized in that the polymeric carriers are combined with the biomass in the clarified liquid in the activated-sludge stage, and thoroughly mixed therewith. After proliferation, the biomass is magnetically separated together with the organic carrier in the activated-sludge stage and/or optionally in the final settling stage. The biomass is largely removed therefrom, (for example by squeezing out or whirling up in concentrated aqueous phase), and the polymeric carrier freed from the excess sludge is returned to the activated-sludge stage. More particularly, only a proportion of the mixture of biomass and polymeric carrier, preferably corresponding to the excess of activated sludge, is magnetically separated in this embodiment. The biomass is substantially removed from the polymeric carrier and the polymeric carrier is returned to the activated-sludge stage.

According to the invention, the sewage may even be freed by application of a magnetic field in later stages of the treatment process from the suspended biomasses and polymeric carriers preferably at spillways.

The organic polymeric carriers containing magnetic materials incorporated in abrasion-resistant form used in the process according to the invention may be those which contain magnetic heavy metal oxides or mixed oxides or iron powders, preferably magnetite, bound in a polymeric matrix (which may be a polymerisate, a polycondensate and/or a polyaddition product) in homogeneous and preferably, cellular form.

The inorganic, magnetically separable material useful herein include oxides, a mixed oxide of heavy metals, preferably iron oxides such as $Fe_3O_4$ (magnetite) and $\gamma$-$Fe_2O_3$. Also useful are chromium (IV) oxide, barium ferrite and even iron powder. The materials used generally have average particle sizes of less than 50 $\mu$m, preferably less than 10 $\mu$m, and more preferably less than 3 $\mu$m. The production of iron oxide pigments is accompanied by the formation in large quantities of magnetic iron oxide $Fe_3O_4$ (magnetite) in a particle size of generally below 3 $\mu$m which is particularly suitable for the application according to the invention and performs an ecologically important function. In the incorporation of magnetically separable materials in polymeric plastics, it is also possible to use iron powders in oxidation-stable form.

The organic polymer carriers containing magnetic materials used are preferably those which contain magnetite or iron powder and other fillers based on particulate, preformed foams (preferably polyurethane foams), and/or powder-form lignocelluloses (lignite powder and/or peat) and/or carbon powder (active carbon, carbonized lignite powder, coke powder, coal powder) and, optionally, other fillers. The polymer itself is preferably a matrix of cationic and/or anionic and/or non-ionic polyurethane(ureas) or polymerization products of vinyl and/or divinyl compounds.

The preferred magnetically separable polymeric carriers contain magnetically separable materials (preferably magnetite) incorporated in abrasion resistant form as fillers and serve as a growing surface for biomasses in the sewage treatment process. The biomasses which has collected in a high according to the invention from the carrier material by squeezing out or whirling up in aqueous phase. The polymeric carrier freed at least from the excess sludge may be quantitatively returned to an activated-sludge tank and reversibly used as often and for as long as required.

The advantages of the invention lie principally in the increase in operational reliability and in throughput and in the improved possibility of separating magnetic biomass using magnetic fields. By virtue of the magnetic separation, final settling tanks of large volume are no longer necessary, overloaded treatment plants may be restored to normal loads and new treatment plants may be built with much smaller tank volumes.

By embedding magnetic heavy metal oxides or mixed oxides, such as heavy metal oxides or mixed oxides, such as magnetite, $\gamma$-iron oxide, chromium (IV) oxide or barium ferrite, or even pure iron powder in a polymeric matrix (particularly cellular polymers), preferably produced by in situ-polymerization (e.g. polycondensation or polyaddition), it is possible to create particularly large growing surfaces, permeable voids and protective cells for the microorganisms which enable much higher concentrations of bacteria to be reached than would be possible without these materials.

According to the invention, the heavily colonized polymeric carriers are separated with the grown biomass in a magnetic field, for example with a rotating magnetic roller or a magnetic net and may be separated off from the biomass, for example by squeezing out between two contrarotating rollers and recycled quantitatively, i.e., with virtually no loss of carrier, to the activated-sludge stage. On the other hand, the biomass accumulates in a concentration from 3 to 6 times higher than in any standard sedimentation process, which is another advantage. The sludge concentrate may be recycled as required in any ratio to an activated-sludge tank or removed from the circuit as excess sludge and disposed of without any need for the otherwise usual sedimentation in final settling tanks. In one special embodiment of the process, it is even possible completely to suppress the formation of bulking sludge and, by installing a weir which permits magnetic separation, to accumulate magnetically separable carrier in such a large quantity that it acts like a filter and completely eliminates suspended constituents from the sewage so that the overflowing liquid is particularly clear.

The present invention relates to the magnetic separation of the polymeric carriers laden with biomasses and not to their general use in the biological treatment of sewage. The production of some suitable polymeric carriers containing inorganic materials is described in U.S. application Ser. Nos.: No. 764,688, filed Mar. 29, 1984; 672,441, filed Nov. 16, 1984: 672,439, filed Nov. 16, 1984: and Ser. No. 672,440, filed Nov. 16, 1984: and in German Application No. P 35 26 185 filed Jul. 23, 1985, and German Application No. P 35 26 184 filed Jul. 23, 1985. Accordingly, they are only summarily characterized here.

The polymeric carriers in question are non-floating, water-absorbing, highly filled polymeric carriers which contain magnetically separable materials and, optionally, other fillers incorporated in abrasion-resistant form and which remain stable even for periods of several years in water, particularly in biological settling basins.

The binders used for fillers include polymers which are coagulated in the form of aqueous dispersions and/or polyurethane (urea) compositions which are preferably used as polyisocyanate prepolymers, optionally as aqueous emulsions or as aqueous polyurethane dispersions and which act as a matrix for the fillers. Low molecular weight polyisocyanates may serve as modifying components for the aqueous polymer dispersions and increase the binding power of the polymer matrix. The polymers may be nonionic or may contain anionic and/or cationic groups in the macromolecule or as emulsifier. In many cases, ionic, particularly cationic, polymer carriers (which have a favorable effect both on the biomass and on the fillers to be bound or coated) are preferably used in the biological sewage treatment process.

Particular significance is attributed to the choice of the fillers, which may be used in addition to the magnetically separable inorganic materials, in regard to their water uptake capacity and their ability to adsorb ingredients dissolved in the sewage and in regard to the development of large surfaces and hence voids and protective cells for the proliferation of biomasses.

The fillers used include, in particular, fossil lignocelluloses, such as lignite and/or peat, or derivatives thereof, (such as lignite coke) or active carbon, coal, or coke powder. The average particle size of the fillers mentioned above should be 1 mm, preferably below 0.3 mm and more preferably 0.1 mm. Homogeneous and/a cellular polymer and/or polyurethane plastics can also be used as a filler in size-reduced form.

Particularly preferred fillers are polyurethane foams in size-reduced, particulate form. Particularly preferred are flexible polyetherpolyurethane block foams having an average particle size below 30 mm, preferably below 20 mm and more preferably below 10 mm, which are available in large quantities as waste granulate. Semi-rigid or rigid polyurethane foams can also be used.

The open-cell polymeric carriers produced with addition of magnetic metal oxides or iron powders are considerably lighter than the non-cellular carriers and, accordingly, not only afford advantages in the biological degradation of organic compounds in the sewage, but are also eminently suitable for separation in a magnetic field in accordance with the invention. Comparison of the dry matter contents of equal volumes of an aqueous suspension (without supernatant water) shows that the polymeric carriers produced without a foam structure, preferably with the preferred additions of magnetically separable materials of higher specific gravity, are around 5 to 10 times heavier for a surface comparatively reduced to a fraction, so that the non-porous polymeric carriers should be reduced to average particle sizes below 5 mm and preferably below 2 mm for use in accordance with the invention.

The polymer carriers contain magnetically separable materials in a quantity of from 1 to 99% by weight, preferably in a quantity of from 5 to 85% by weight and more preferably in a quantity of from 5 to 60% by weight, based on the dry weight of the polymeric carrier.

In special cases, the cellular polymer carriers (preferably highly filled polyurethane urea carriers), may even be directly produced, i.e. without preformed foams, as cellular polyurethanes containing the magnetically separable, inorganic materials and, optionally, other fillers, from the starting components or from the isocyanate prepolymers, especially when the filler content is at the lower limit indicated. This new process of preparation, which will be described in detail, is also claimed in this invention.

In most cases, production of the highly filled polymeric carriers is carried out in the presence of large quantities of water. In the production of magnetic polyurethane (urea) carriers, the water is a dispersant for the fillers and emulsifier for, for example, NCO prepolymers (NCO content approx. 3 to 12% by weight) which only coat and bind the fillers in extremely finely divided form. Only a small fraction of the quantity of water used also reacts as chain-extending agent with formation of polyurea groups and elimination of carbon dioxide. Troublesome secondary reactions with fillers containing H-acid groups (for example with the lignite) are suppressed. The water content amounts to between about 40 and 80% by weight, based on the formulation as a whole.

In the case of the magnetically separable polymeric carriers produced with aqueous polymer-dispersions by coagulation thereof on the magnetically separable materials and/or other fillers, equally large quantities of water are used although, in contrast to prepolymers containing NCO groups, fully reacted polymer dispersions are known not to react with the water. Coagulation of the polymer latices and of the polyurethane dispersion requires a production method to be selected through preliminary tests according to the nature and ion charge, if any, of the latices and dispersions and also depending upon the type of fillers and the effect which they have upon the gelation and coagulation of the aqueous dispersions used as binders. In the production of the magnetic polymeric carriers, the aqueous dispersion intended as binder must first be completely uniformly combined with the filler or filler mixture in standard mixing machines, followed in one or more stages by gelation, flocculation and complete precipitation (coagulation) with formation of a thin film or coating to agglomerate and bind the filler.

The flocculants or coagulants uced include electrolytes, polyelectrolytes, mineral acids or carboxylic acids or even basic solutions. In addition or alternatively, heat sensitization can be carried out by heating the mixtures to temperatures approaching the boiling point of water, so that when the magnetic polymeric carrier is subsequently washed there is no bleeding of any residues of the polymer dispersion. This process of preparation of carriers, formed by coagulation of polymer dispersions is described in a copending application.

The present invention also relates to a process for the production of cellular polyurethane (urea) compositions with an ionic group content, comprising reacting:

(A) at least one di- and/or polyfunctional, NCO-terminated prepolymer, preferably having an isocyanate functionality of 2.1 or more, having an isocyanate group content of 2-12% by weight, preferably 2.5 to 8 % by weight, wherein said component (A) is prepared by reacting
  (a) organic materials having two or more hydrogen atoms, which are reactive with isocyanate groups and having molecular weights of from 400 to 10,000, preferably polyhydroxy compounds, most preferably hydrophobic polyether polyols with an oxyethylene content of less than 20 % by weight,
  (b) from 0 to about 5 moles per mole of (a) of organic materials having two or more hydrogen atoms, which are reactive with isocyanate groups, preferably having hydroxyl groups, and having molecular weights of from 32-399, preferably di- and/or polyols having molecular weights of from 62 to 254,
  wherein components (a) and (b) may contain ionic groups or groups capable of ionic group formation, cationic groups being preferred, and (c) organic di- and/or polyisocyanates, (B) water, with the quantity of water being in excess of that required to react with all the isocyanate groups of (A), preferably in an amount of from 2 to 60 times the weight of component (A), (C) from 1 to 99% by weight, preferably 1 to 60% by weight, of a member selected of finely divided magnetic oxides or mixed oxides, pure iron powder, and mixtures thereof, preferably of magnetite with <0.3 μm particle size, the amount of component (C) being based on the total moisture free weight of component (A)

(D) and optionally additional organic or inorganic fillers, with the provision to exclude preformed polymer foams, liqnite or peat, eventually usual additives, stabilizers, foaming agents, to form abrasion resistant, cellular polyurethane based carriers with a water absorbability value of from 33 to 97% by weight, an inorganic magnetic oxides or mixed oxides or iron powder content of from 1 to 99% by weight, preferably 1 to 60% by weight, and a content of from 10 to 3000, preferably 30 to 1500 milliequivalents of ionic groups or groups capable of forming ionic groups, per 1000 grams of (A).

The components (A) to (D) can be used as described in the German Offenlegungsschrift 3 402 698. The definition of the water absorbility value is mentioned there in detail. The generally applicable process of reaction is described in detail in that literature also.

Another embodiment of the invention are cellular polyurethane(urea) carriers containing 1-99% by weight of magnetic oxides, mixed oxides or iron powder or mixtures thereof, as they are produced by the process according to the invention.

The invention is further illustrated but is not intended to be limited by the following examples in which all parts and percentages are by weight unless otherwise specified.

EXAMPLES

Figure 2:
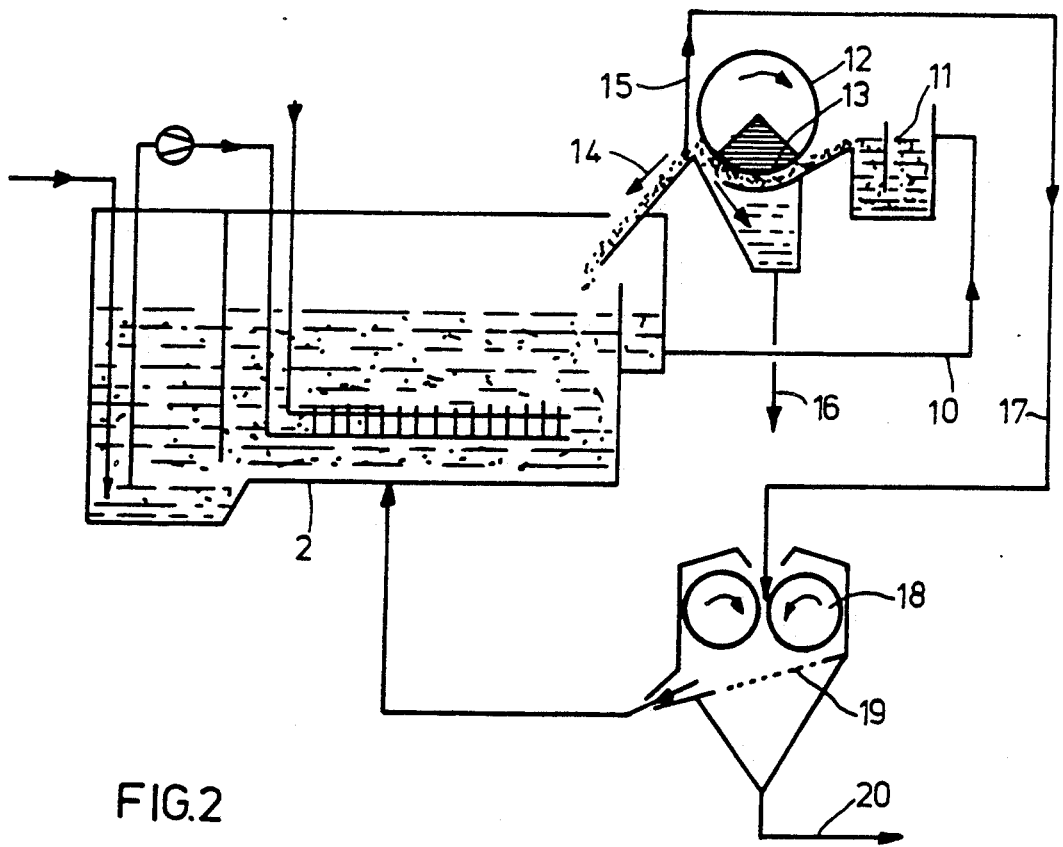
FIG. 2 represents a modification of the plant of FIG. 1.

EXAMPLES (FIGS. 1 and 2)

Two parallel pilot-scale experimental sewage treatment plants were set up, one of which was operated without a carrier for comparison (Plant I) and the other with a magnetically separable carrier in accordance with the present invention (Plant II). Both plants were filled with activated sludge from an industrial sewage treatment plant, which was characterized by the formation of bulking sludge, and operated with a typical flow of sewage.

In both plants, from the preliminary clarification tank (1), the activated-sludge tank (2) is continuously charged with sewage. Oxygen is supplied through perforated pipes (3) at the bottom of the tank.

In the case of Plant I, the mixture of activated sludge and sewage was delivered through pipe (4) to the degassing cyclone (5) and introduced into the final settling tank (6). The sludge is returned to the activated-sludge tank (2) by the pump (7). The surplus sludge is run off via the bypass (8). The purified sewage leaves the final settling tank via the. channel (9).

In plant II, the effluent from the activated-sludge tank (2) is not delivered to the final settling tank as in plant I, but instead is delivered to a magnetic roller (12) via the receiver (11 and line 10) The magnetic activated sludge is quantitatively separated by the magnetic roller with the permanent magnet (13). The sludge on the magnetic roller is returned via the stripper (14) to the activated sludge tank (2) and the surplus sludge is removed via the channel (15). The clear liquid of the purified sewage from the bowl of the magnetic roller is run off through the pipe (16).

The surplus sludge adhering to the carrier is conveyed via line 17 to squeezing rollers (18). The carrier is separated by the inclined sieve (19) and returned free from any lesser to the tank (2). The highly concentrated surplus sludge is removed through pipe 20 for disposal.

General procedure for continuous production of the magnetically separable carriers for Examples 1 and 2, type 1 and type 2

The apparatus used is a double-paddle screw trough with a capacity of approx. 180 liter and a length of approx. 300 cm, the paddle shafts rotating in opposite directions. The product is forced along from the inlet opening towards the outlet opening, the reaction mixture being kneaded or squeezed to a certain extent between the paddle shafts. The polyurethane foam waste size-reduced to a particle size below 12 mm, magnetite and the lignite dust or lignite coke are separately delivered to the screw trough by metering screws. At the same place, the water and/or the aqueous polymer latex is introduced by means of piston pumps and the NCO prepolymer by means of gear pumps. It is advisable, although not absolutely essential to intensively mix the cationic NCO prepolymer with approximately twice the quantity of water at about 10° to 25° C. for a few seconds either in a flow mixer or in a static mixer and thus to convert it into an emulsion, because in this way the predried lignite dust is wetted extremely quickly and uniformly with the remainder of the water heated to 50° C. The NCO prepolymers uniformly coat the solids and foams in very finely divided form.

After a residence time in the screw trough of approximately 3 minutes, a 5% aqueous magnesium sulfate solution (1% by weight of MgSO₄, based on NCO prepolymer) for type 1 and a 1% sodium hydroxide solution (0.3% by weight NaOH, based on latex dry matter) for type 2 is sprayed through a 1 mm diameter nozzle into the last third of the mixing unit. Through an opening in the underneath of the trough at its end, the carrier, type 1, is discharged into containers half-filled with water and is washed with water. In the case of the polymeric carrier, type 2, the carrier is coagulated with hot air for 3 minutes in a drying tunnel at a product temperature of 80° to 90° C. and then washed.

TABLE 1

| Quantities in parts by weight | Type 1 | Type 2 |
|---|---|---|
| Flexible polyether polyurethane block foam waste flakes 12 mm | 35 | 35 |
| Magnetite 3 μm | 50 | 50 |
| Lignite dust 200 m, 90% 100 μm | 15 | — |
| Lignite coke 300 m, 85% 100 μm | — | 20 |
| Cationic, hydrophobic branched polyether-isocyanate prepolymer (NCO content 5.8% by weight) | 20 | — |
| Cationic latex of butadiene-acrylonitrile and trimethylammoniumethylacrylate chloride | — | 15 |
| Water content during production in % by weight, based on formulation as a whole | 50 | 50 |
| Dry matter content (kg/m³ suspension) without supernatant water | 69 | 103 |
| Water update capacity in aqueous suspension (%)* | 93.1 | 89.7 |
| Specific gravities (kg/m³): drained (after 10 mins.) | 439 | 453 |
| Squeeze-dried (3 bars) | 226 | 233 |
| dried under reduced pressure at 100° C. | 93 | 108 |

*Percentage of water in and between the porous polymeric carrier particles in aqueous suspension without supernatant water

EXAMPLE 1

Of two parallel pilot-scale experimental sewage treatment plants of the type described, one is operated without a carrier for comparison (plant I) while the other is operated in accordance with the invention with addition of polymeric carrier, type 1, Table 4, containing inter alia magnetite bound in abrasion-resistant form (plant II).

A polyurethane urea carrier of preformed polyurethane foam, magnetite, lignite dust and a cationic, hydrophobic polyisocyanate prepolymer (as binder) is used as the type 1 carrier.

Before start-up, 1000 liter of type 1 magnetite-containing polymeric carrier, particle size <12 mm, is introduced in accordance with the invention into the activated sludge tank of plant II, corresponding to a filling volume of 38%, based on the volume of the activated-sludge tank.

From the preclarification tank (1) (see FIG. 1), both plants are each continuously charged with 260 liter/hour of an industrial, non-readily degrading sewage, corresponding to a retention time of 10 hours.

In the case of plant I, turbulence is generated in the activated-sludge tank (2) by the introduction of oxygen, carrying the mixture of activated sludge and sewage through the degassing cyclone (5) into the final settling tank (6) for sludge separation.

The sludge is recycled to the activated sludge tank (2) by the pump (7). The surplus sludge is run off through the bypass (8).

In plant II, the activated-sludge microorganisms proliferate on the polymeric carriers in a high concentration of up to 3–4% by weight, based on the drained carrier, and are separated together with the carriers via the magnetic roller (12) (cf. FIG. 2) and are separated from the purified sewage. The polymeric carrier and the biomasses adhering thereto are returned by the stripper (14) to the activated-sludge tank (2). In this case, the surplus sludge adhering to the carrier is separated therefrom by squeezing rollers (18). The carriers are separated by the inclined sieve (19) and are returned free from any losses to the activated sludge tank (2). The highly concentrated surplus sludge (approx. 4–6% dry matter, normally about 1% dry matter) is removed through pipe (20) for disposal.

After an acclimatization period of 4 weeks, the measurements shown in Table 2 are determined as average values from daily mean samples taken from both plants over a period of 24 days.

TABLE 2 to Example 1
Average values from 24 daily mean samples

|  |  | Plant I | Plant II |
|---|---|---|---|
| Influent volume | | 260 l/h | 260 l/h |
| Retention time | | 10 h | 10 h |
| Influent | | | |
| *COD | | 1760 mg/l | 1760 mg/l |
| **TOC | | 440 mg/l | 440 mg/l |
| ***BOD₅ | | 520 mg/l | 520 mg/l |
| Effluent | | | |
| COD | | 690 mg/l | 420 mg/l |
| | = | 61% elim. | 76% elim. |
| TOC | | 160 mg/l | 97 mg/l |
| | = | 64% elim. | 78% elim. |
| BOD₅ | | 85 mg/l | 48 mg/l |
| | = | 84% elim. | 91% elim. |
| Settable matter after 2 hours | | 0.7 ml/l | 0.1 ml/l |
| Suspended matter in the supernatant phase | | 224 mg/l | 76 mg/l |

*COD = Chemical oxygen demand
**TOC = Total organic carbon
***BOD₅ = Biochemical oxygen demand The advantages afforded by the invention through the addition of magnetic polymeric carriers are apparent, i.e. an increase in operational reliability and in throughput, the avoidance of bulking sludge, increased COD elimination and an improvement in the separation of the magnetic carriers by a magnetic field without any need for final settling (which is a very considerable advantage).

In addition, it is possible by a simple process step, i.e. by squeezing out during disposal of the surplus sludge, to separate the polymeric carriers from the activated sludge and to return them free from any losses to the activated-sludge tank and, at the same time, to isolate and to dispose of a much more highly concentrated surplus sludge.

EXAMPLE 2

Of the two parallel pilot-scale experimental sewage treatment plants of the type described in Example 1, one is operated for comparison while the other is operated in accordance with the invention with addition of a polymeric carrier containing inter alia magnetite bound in abrasion-resistant form. A cationic polymeric carrier of preformed polyurethane foam, magnetite, lignite coke and a polymer latex of styrene, butadiene and acrylonitrile (as binder) is used as the type 2 carrier, Table 1.

Before start-up, 1700 ml of the above-described carrier are introduced in accordance with the invention into the activated sludge tank of plant II, corresponding to a filling volume of 65%, based on the volume of the activated-sludge tank.

In this case, a non-readily degrading effluent is used and the procedure adopted is as described in detail in Example 1.

After an acclimatization period of 4 weeks, the measurements shown in Table 3 are determined as average values from daily mean samples taken from both plants over a period of 17 days.

TABLE 3 to Example 2
Average values from 17 daily mean samples

| | Plant I | Plant II |
|---|---|---|
| Influent volume | 145 l/h | 145 l/h |
| Retention time | 18 h | 18 h |
| Influent: | | |
| *COD | 1386 mg/l | 1386 mg/l |
| **TOC | 392 mg/l | 392 mg/l |
| ***BOD$_5$ | 232 mg/l | 232 mg/l |
| Ammonium, NH$_4$ | 54 mg/l | 54 mg/l |
| Effluent: | | |
| COD | 1067 mg/l | 333 mg/l |
| = | 23% elim. | 76% elim. |
| TOC | 306 mg/l | 106 mg/l |
| = | 22% elim. | 73% elim. |
| BOD$_5$ | 203 mg/l | 44 mg/l |
| = | 12.5% elim. | 81% elim. |
| Settable matter after 2 hours | 0.6 ml/l | 0.1 ml/l |
| Suspended matter in the supernatant phase | 280 mg/l | 64 mg/l |
| Ammonium, NH$_4$ | 48 mg/l | 2.4 mg/l |
| = | | 95.6% elim. |

*COD = Chemical oxygen demand
**TOC = Total organic carbon
***BOD$_5$ = Biochemical oxygen demand It has been repeatedly described in the literature (cf. for example Lehr-und Handbuch der Abwassertechnik, Vol. II) that the nitrifying microorganisms have a distinctly lower proliferation rate than other microorganisms and are removed from the system during disposal of the surplus sludge. Accordingly, nitrification can only take place when the activated sludge remains in the system for a long time (high sludge age) so that nitrifying microorganisms are formed in sufficient quantities. However, this contrasts with the fact that, in view of the high sludge proliferation rates, provisionment be made for corresponding disposal of the surplus sludge so that most of the nitrificants are removed from the system.

By using the carriers here, it is possible to fix nitrificants in sufficient quantities on the carriers in order to eliminate ammonium with these nitrificants and, if necessary, to effect the magnetic separation according to the invention as described in Example 1.

EXAMPLE 3

(3a) Cellular carrier mass, produced by direct reaction of NCO-prepolymer, magnetite and water, according to the invention.

35 parts by weight of magnetite (Fe$_3$O$_4$; <3 μm particle size)

65 parts by weight of a cationic, branched, hydrophobic NCO-prepolymer, as described as type 1/table 1 (NCO-content 5.8% by weight), 33.3 parts by weight of water (55° C. warm) are reacted. The magnetite and the cationic prepolymer are mixed at room temperature and the warm water is added within 20 sec. under intensive stirring. The creamy mixture is transferred into a box, where within 4 minutes an open cell "foam" is rising, which is then heated at 80° C. during 15 minutes. The foam block shows a density of 116 kg/m$^3$ and is thereafter granulated into pieces of less than 6 mm.

The cellular granulate is immediately sedimenting in water; the suspension formed (without supernatant water) has a dry content of 74 kg per 1 m$^3$ of that suspension. The water absorbability value in aqueous suspension is 92.6%.

(3b) Biological treatment and separation with the carrier:

A sewage plant (analogous to plant II of Example 2 is filled with carrier (3a) (instead of carrier type 1) and is run as described in Example 2.

The elimination rates (CSB, TOC, BSB$_5$) correspond to the values of Example 2, Table 3.

The carriers advantageously improve the safe sewage treatment, improve the output of purified sewage and can be removed—together with surplus sludge by magnetic treatment.

COMPARISON EXAMPLE

A cellular carrier material is produced from the cationic branched hydrophobic NCO prepolymer of type 1, Table 1 (NCO content of 5.8%) and water in accordance with Example 3a, except that no magnetite is added. The foam of uniform density is granulated to foam pieces of a size below 6mm.

If the resultant material were used according to Example 3b, approximately 40% of the carrier material would float to the surface even after a period of operation of 4 weeks. The purification effect is virtually no different from a comparative test without using carriers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the improved separation of clarified liquid from biomass in the biological treatment of sewage comprising
   (a) combining the biomass in the clarified liquid with an organic polymer carrier prepared by reacting:
      (A) at least 1 di- and/or polyfunctional isocyanate terminated prepolymer having an isocyanate group content of from 2 to 12 percent by weight,
      (B) water with the quantity of water being in excess that is required to react with all the isocyanate groups of (A), and
      (C) from 1 to 99 percent by weight of a member selected from the group consisting of finely divided magnetic oxide or mixed oxides, pure iron powder and mixtures thereof, the amount of component (C) being based on the total moisture free weight of component (A), said carrier having a water absorbability of from 33 to 97 percent by weight and a content of ionic groups or ion forming groups of 10 to 3000 milliequivalents per 1000 g of filler-free product, and said carrier occupying a suspension volume of from 1 to 85 percent based on the clarified liquid, and (b) separating said biomass, which contains said carrier from said clarified liquid by application of a magnetic field.

2. The process of claim 1, wherein the organic polymeric carriers containing inorganic magnetic materials used are those which contain magnetic heavy metal oxides or mixed oxides and/or iron powders bound in a polymeric matrix.

3. The process of claim 2, wherein magnetite and other fillers selected from the group consisting of particulate, preformed foams, powder-form fossil lignocelluloses, carbon powder and, other fillers of inorganic character are used.

4. The process of claim 1 wherein said component (A) is prepared by reacting:
   (a) organic materials having two and/or more hydrogen atoms which are reactive with isocyanate groups and having molecular weights of from 400 to 10,000,
   (b) from 0 to about 5 moles per mole of (a) of organic materials having two and/or more hydrogen atoms which are reactive with isocyanate groups and having molecular weights of from 32 to 399,
   (c) organic di- and/or polyisocyanates.

5. The process of claim 4, wherein said materials (a) are polyhydroxyl compounds, having a total hydroxyl functionality of 2.1 or more.

6. The process of claim 5, wherein said materials (b) contain hydroxyl groups.

7. The process of claim 5, wherein components (a) and/or (b) contain ionic groups or groups capable of ionic group formation.

8. The process of claim 1 wherein said component (A) has an isocyanate functionality of 2.1 or more.

9. The process of claim 8, wherein said component (A) has an isocyanate group content of from 2.5 to 8% by weight.

10. The process of claim 1 wherein component (B) is used in an amount of from 2 to 60 times the weight of component (A).

11. The process of claim 1 wherein component (C) is used in an amount of from 1 to 60 percent by weight in the carrier.

12. The process of claim 1 wherein said component (A) has an isocyanate group content of from 2.5 to 8% by weight, and is prepared by reacting:
   (a) polyfunctional hydrophilic and/or hydrophobic polyether polyols having a total hydroxyl functionality of 2.1 or more,
   (b) from 0 to 2 moles per mole of (a), of low molecular weight di- and/or polyols having a molecular weight of from 62 to 254, with components (a) and/or (b) containing quaternary ammonium groups or salt-forming tertiary amino groups, and
   (c) aromatic diisocyanates.

13. The process of claim 12, wherein hydrophobic polyether polyols are used as component (a).

* * * * *